(12) United States Patent
Yarberry

(10) Patent No.: US 8,950,772 B1
(45) Date of Patent: Feb. 10, 2015

(54) LIGHTWEIGHT CANTILEVER BICYCLE FRAME

(71) Applicant: Kyle Edward Yarberry, Ann Arbor, MI (US)

(72) Inventor: Kyle Edward Yarberry, Ann Arbor, MI (US)

( * ) Notice: Subject to any disclaimer, the term of this patent is extended or adjusted under 35 U.S.C. 154(b) by 0 days.

(21) Appl. No.: 14/027,220

(22) Filed: Sep. 15, 2013

(51) Int. Cl.
*B62K 19/02* (2006.01)

(52) U.S. Cl.
CPC ...................................... *B62K 19/02* (2013.01)
USPC ........................................................ 280/283

(58) Field of Classification Search
CPC .................................. B62K 19/02; B62K 19/12
USPC ......... 280/33.997, 278, 282, 283, 281.1, 274, 280/799
See application file for complete search history.

(56) References Cited

U.S. PATENT DOCUMENTS

| 564,797 | A | | 7/1896 | Lovelace | |
|---|---|---|---|---|---|
| 1,813,639 | A | * | 7/1931 | Richards | 280/274 |
| 2,497,121 | A | * | 2/1950 | Fletcher | 280/261 |
| 3,233,916 | A | | 2/1966 | Bowden | |
| 3,486,765 | A | * | 12/1969 | Turner | 280/278 |
| 4,230,332 | A | | 10/1980 | Porsche | |
| 4,293,141 | A | | 10/1981 | Brilando | |
| 4,453,730 | A | | 6/1984 | Klose | |
| 4,500,103 | A | | 2/1985 | Klein | |
| 4,548,422 | A | | 10/1985 | Christian et al. | |
| 5,072,961 | A | | 12/1991 | Huppe | |
| 5,211,415 | A | | 5/1993 | Gasiorowski | |
| 5,253,890 | A | | 10/1993 | Shimizu et al. | |
| 5,456,481 | A | | 10/1995 | Allsop et al. | |
| 7,651,110 | B2 | | 1/2010 | Davis et al. | |
| 2007/0210556 | A1 | * | 9/2007 | Hon et al. | 280/287 |
| 2011/0210231 | A1 | * | 9/2011 | D'Aluisio | 248/629 |

FOREIGN PATENT DOCUMENTS

WO    WO2012081876    6/2012

* cited by examiner

*Primary Examiner* — Joseph Rocca
*Assistant Examiner* — Felicia L Brittman
(74) *Attorney, Agent, or Firm* — Kyle E. Yarberry

(57) ABSTRACT

A bicycle frame, comprising at least two members, capable of improving upon at least several aspects of existing bicycle frames, including cost, weight, and reliability, while accommodating a wide range of rear tire widths. Various embodiments accomplish these improvements through the employment of structurally efficient cross sections, few supporting members, a cantilever rear wheel support, and few locations where members are adjoined and susceptible to certain failure modes.

7 Claims, 5 Drawing Sheets

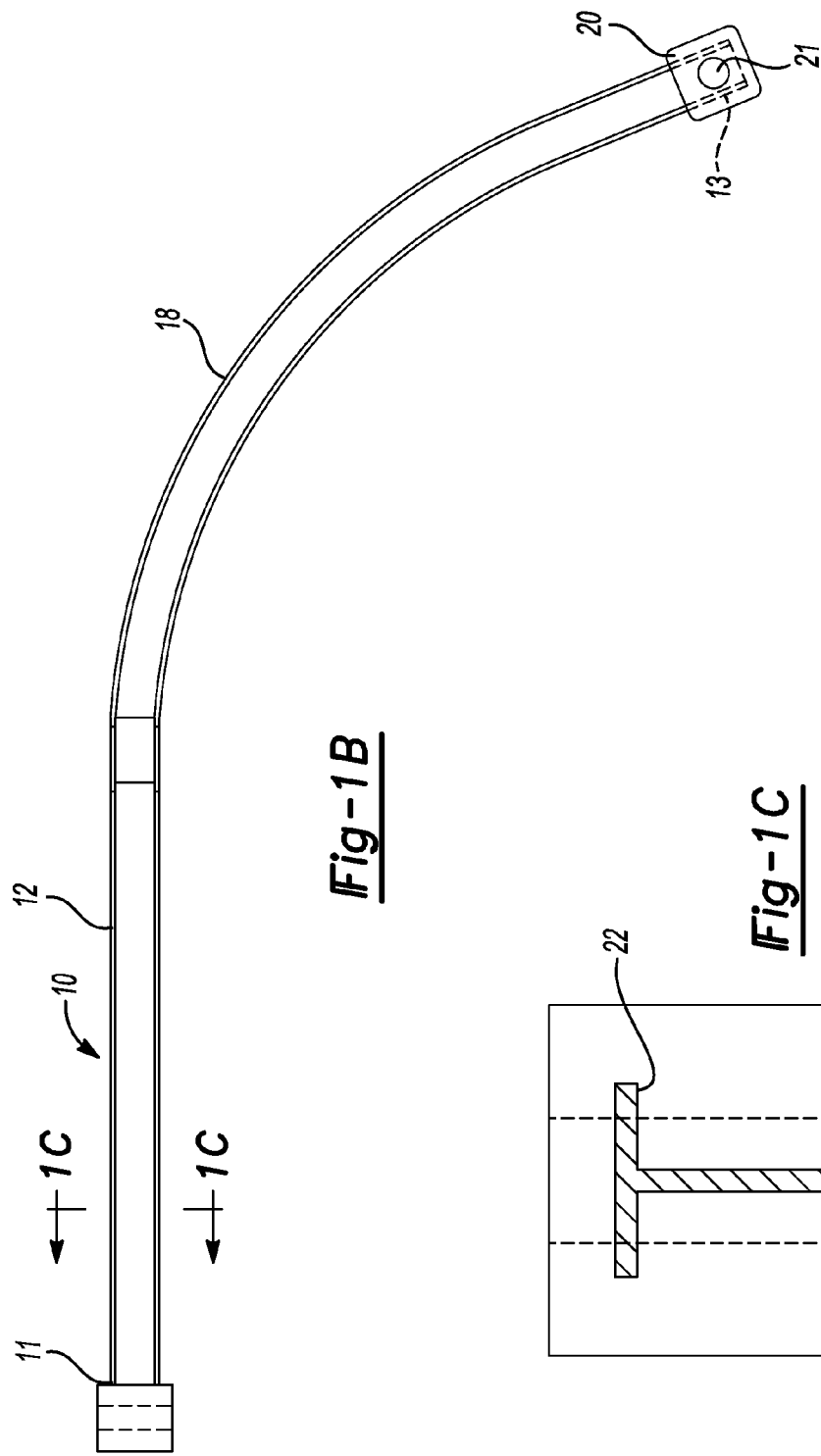

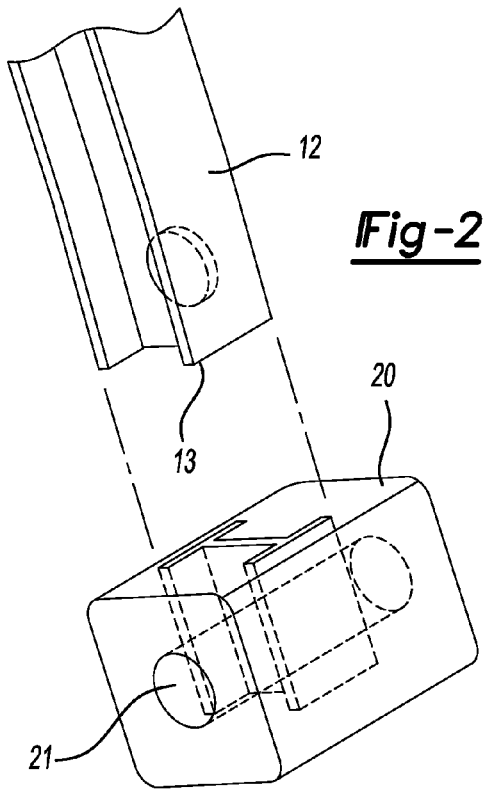
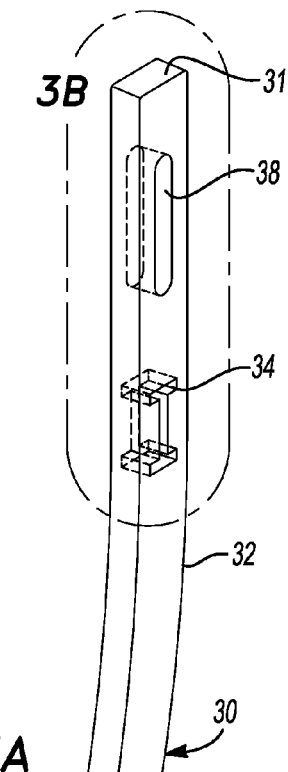
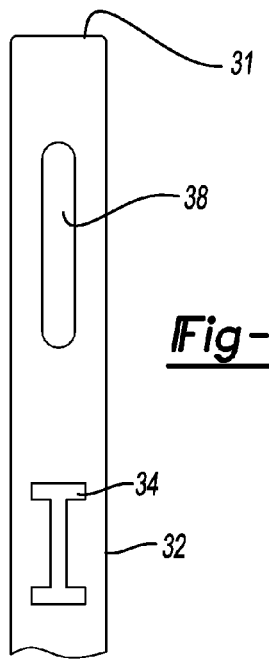

LIGHTWEIGHT CANTILEVER BICYCLE FRAME

BACKGROUND

The present application relates to a bicycle frame; specifically, it relates to a frame design that improves upon limitations of existing bicycle frame designs, including weight, reliability, and cost. Early bicycle frames were constructed of tubular sections joined together with lugs. Over time, innovations in the fields of materials and manufacturing methods drove improvements in bicycle frame design, including the elimination of lugs and tubing, reductions in weight, lower construction costs and improvements in strength and rigidity. Presently, diamond-type bicycle frames are common given an economic combination of strength, stiffness, and manufacturability. Such designs are constructed by joining a head tube, a top tube, a down tube, a seat tube, a pair of seat stays, and a pair of chain stays. To improve strength and rigidity, such frames utilize duplicate seat stays and chain stays, resulting in higher weight and cost. These members often reflect cross sections which do not offer a high stiffness relative to cross-sectional area when compared to more structurally efficient cross sections. Consequently, achieving overall frame stiffness in such designs requires additional material, further contributing to higher overall weight and cost. More recent bicycle frame innovations, such as monocoque designs, successfully reduce weight but are more difficult and expensive to manufacture, thereby limiting accessibility to many consumers. Although manufactured relatively inexpensively and thus accessible to many consumers, diamond-type bicycle frames feature many locations where members are adjoined by methods such as brazing and welding; such joining methods add to the total cost of frame construction and introduce the possibility of failure modes at those locations. Some relevant failure modes include fatigue fracture, brittle fracture, and impact fracture at the location where members are adjoined. Separately, the distance between the seat stays of diamond-type bicycle frames limits the wheel and tire combinations which may be mounted to the frame. For example, a frame designed to accommodate a standard 26 inch×2.1 inch rear tire may not be able to accommodate a 26 inch×3.8 inch rear tire. Thus, there is a continuing need for improvements in bicycle frame design. As a result of the shortcomings of the prior art described above, a bicycle frame design which features a lower weight and lower susceptibility to certain failure modes while reducing cost and enabling the use of a wide range of tire sizes is needed.

SUMMARY

It is therefore an object of one embodiment of the lightweight cantilever bicycle frame to provide an improved bicycle frame capable of being manufactured with a lower overall cost. Another object of one embodiment is to provide an improved bicycle frame with reduced weight. Still another object of one embodiment is to provide an improved bicycle frame with lower susceptibility to failure modes associated with joining methods. Still another object of one embodiment is to provide an improved bicycle frame capable of supporting a wide range of rear tire sizes.

According to one embodiment of the lightweight cantilever bicycle frame, there is provided a bicycle frame comprising: a primary member of continuous length of material with at least three bends and a rear hub supporting means, wherein the cross section of at least a portion of the primary member reflects a structural shape; a secondary member attached to the primary member, whereby the primary member and the secondary member are together operable to support bicycle components and a rider with fewer members, less material, and fewer locations where members are adjoined, and to support a wider range of rear tire sizes when compared to the prior art.

ADVANTAGES

Thus one advantage of one or more aspects is its reduced weight when compared to diamond-type bicycle frames of comparable size. This advantage follows because the present embodiment is constructed from as few as two members, supports the rear wheel assembly in a cantilever manner, and utilizes a structurally efficient cross section in the primary member to reduce materials usage.

Thus another advantage of one or more aspects is that it has fewer locations where joining methods are suggested, resulting in lower cost and fewer locations susceptible to failure of such joining methods.

Thus another advantage of one or more aspects is that it can be constructed less expensively due to reduced materials usage and fewer locations where joining methods are suggested, and also due to the correspondingly lower labor requirements for assembly. Additionally, the primary and secondary members can be constructed from commonly available materials, resulting in reduced cost when compared to certain other materials.

Thus another advantage of one or more aspects is that it can accommodate a wide range of rear tire widths, thereby enabling the rider to reconfigure the bicycle for different terrains.

DRAWINGS-FIGURES

FIGS. 1A to 1C show one embodiment of the primary member.

FIG. 2 shows the rear hub supporting means.

FIGS. 3A and 3B show one embodiment of the secondary member.

Figure 1A:
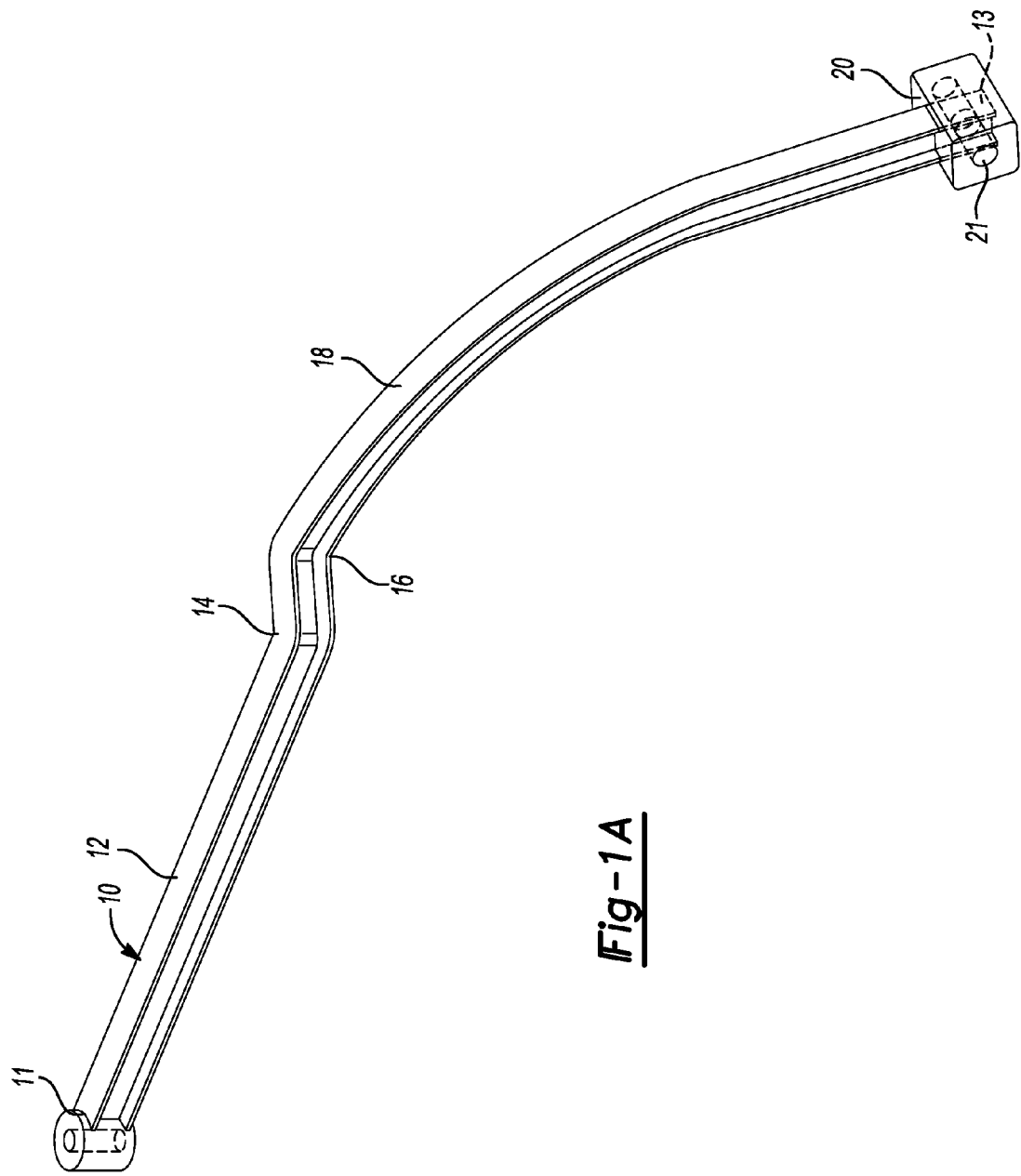

DRAWINGS-REFERENCE NUMERALS 10 primary member
11 forward end
12 first length
13 rearward end
14 first bend
16 second bend
18 third bend
20 rear hub supporting means
21 rear hub aperture
22 cross section
23 rear hub
30 secondary member
31 upper end
32 second length
33 lower end
34 secondary member aperture
36 drive feature supporting means
38 bicycle seat supporting means
39 bicycle seat assembly
40 front assembly
41 front wheel assembly 42 rear wheel assembly
44 drive feature assembly

DETAILED DESCRIPTION

With reference to FIGS. 1A-1C, a primary member 10 is constructed of a first length 12 of material characterized by a forward end 11, a first bend 14, a second bend 16, a third bend 18, and by a rearward end 13 coupled slidably and affixed to a rear hub supporting means 20. In this embodiment, a cross section 22 of first length 12 reflects an I-beam. It is envisioned that first length 12 could be manufactured by imparting bends 14, 16, and 18 upon a commonly available length of structural material.

Again with reference to FIGS. 1A-1C, primary member 10 supports a front wheel assembly 41 via a front assembly 40, it supports a secondary member 30 via a secondary member aperture 34, and it supports a rear wheel assembly 42 via rear hub supporting means 20. Primary member 10 also acts as a deflecting beam to absorb impacts, such as those received through forward end 11 from riding over a drop off. Cross section 22 of primary member 10 reflects an I-beam in order to take advantage such shape's high second moment of area relative to the cross sectional area, thereby controlling deflection and materials usage. First bend 14, second bend 16, and third bend 18 enable primary member 10 to support rear wheel assembly 42 in a cantilever manner via rear hub supporting means 20, thereby further reducing materials usage and cost.

With reference to FIG. 2, rear hub supporting means 20 is a component of primary member 10 affixed to rearward end 13. A rear hub aperture 21 extends through the width of rear hub supporting means 20. It is envisioned that rear hub supporting means 20-could be manufactured from a polymer, such as through a combination of injection molding and material removal processes. Alternatively, rear hub supporting means 20 may be manufactured from metal or other materials.

Again with reference to FIG. 2, rear hub supporting means 20 supports rear wheel assembly 42 in a cantilever manner. To accomplish this, rear hub supporting means 20 couples with and is affixed to rearward end 13. Rear hub aperture 21 receives a rear hub 23, which is a component of rear wheel assembly 42.

In the embodiment shown in FIGS. 3A-3B, secondary member 30 comprises a second length 32 oriented in a near-vertical manner with an upper end 31 and a lower end 33. Secondary member aperture 34 extends through second length 32 at a point proximal upper end 31, and may reflect cross section 22 of primary member 10. At a point proximal lower end 33, any joining method may be employed to affix a drive feature supporting means 36 to second length 32. In this embodiment, drive feature supporting means 36 reflects a cylindrical housing with an interior profile suitable to contain components of a drive feature assembly 44. At a point proximal upper end 31, a bicycle seat supporting means 38 is incorporated.

Again with reference to FIGS. 3A-3B, secondary member aperture 34 receives primary member 10, thereby affixing the position of secondary member 30 relative to primary member 10 along two orthogonal axes. To fix the position of secondary member 30 relative to primary member 10 along a third axis, any joining method may be employed.

In the illustrated embodiment, secondary member 30 supports drive feature assembly 44 via drive feature supporting means 36 and supports a rider via bicycle seat supporting means 38 and a bicycle seat assembly 39. Furthermore, bicycle seat supporting means 38 permits the rider to adjust the distance of bicycle seat assembly 39 relative to drive feature supporting means 36. Secondary functions of secondary member 30 may include maintaining tension in drive feature assembly 44 and transferring energy from the rider to drive feature assembly 44.

Figure 4A:
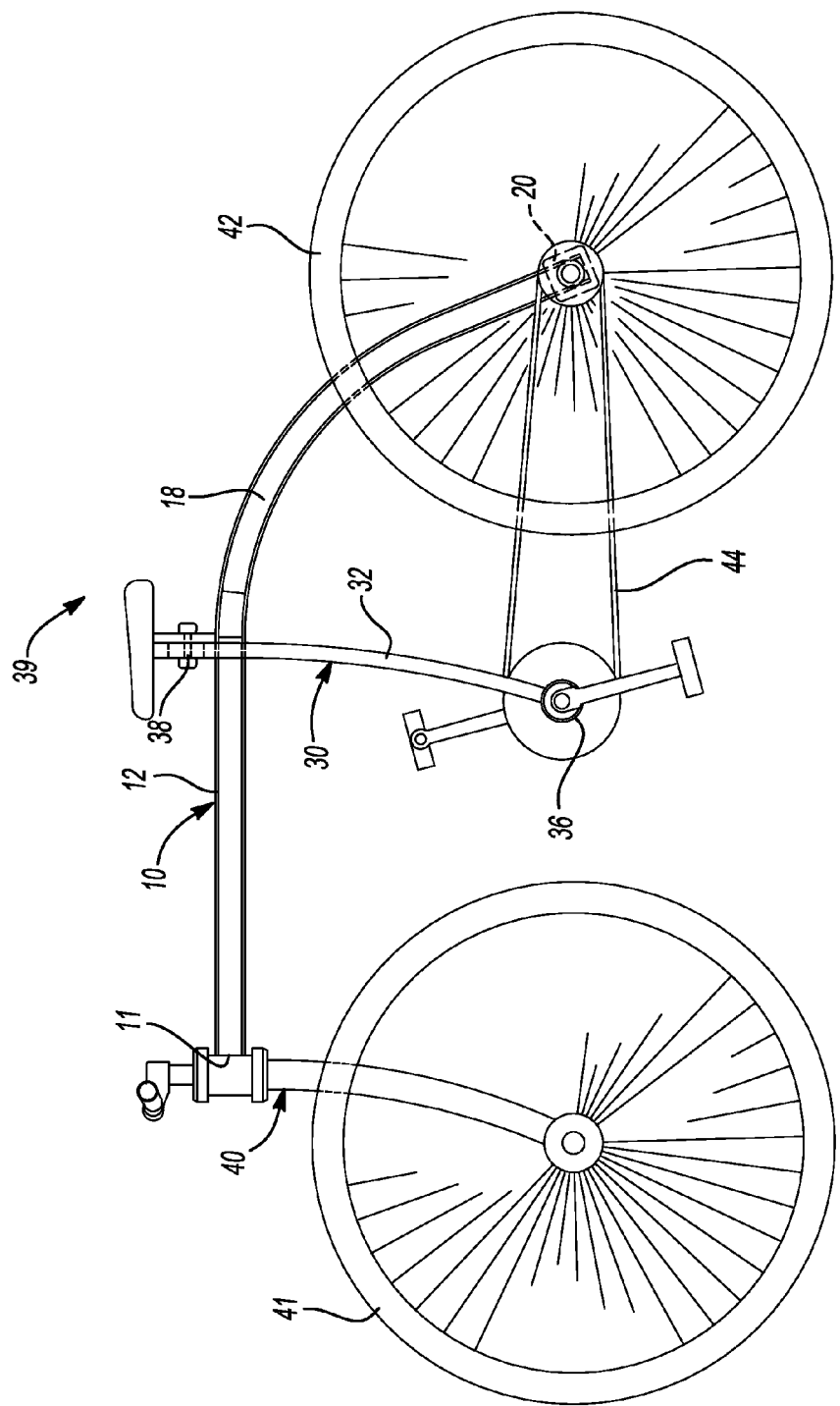
FIGS. 4A and 4B show one embodiment of the lightweight cantilever bicycle frame as it would appear as part of a complete bicycle assembly.
Figure 4B:
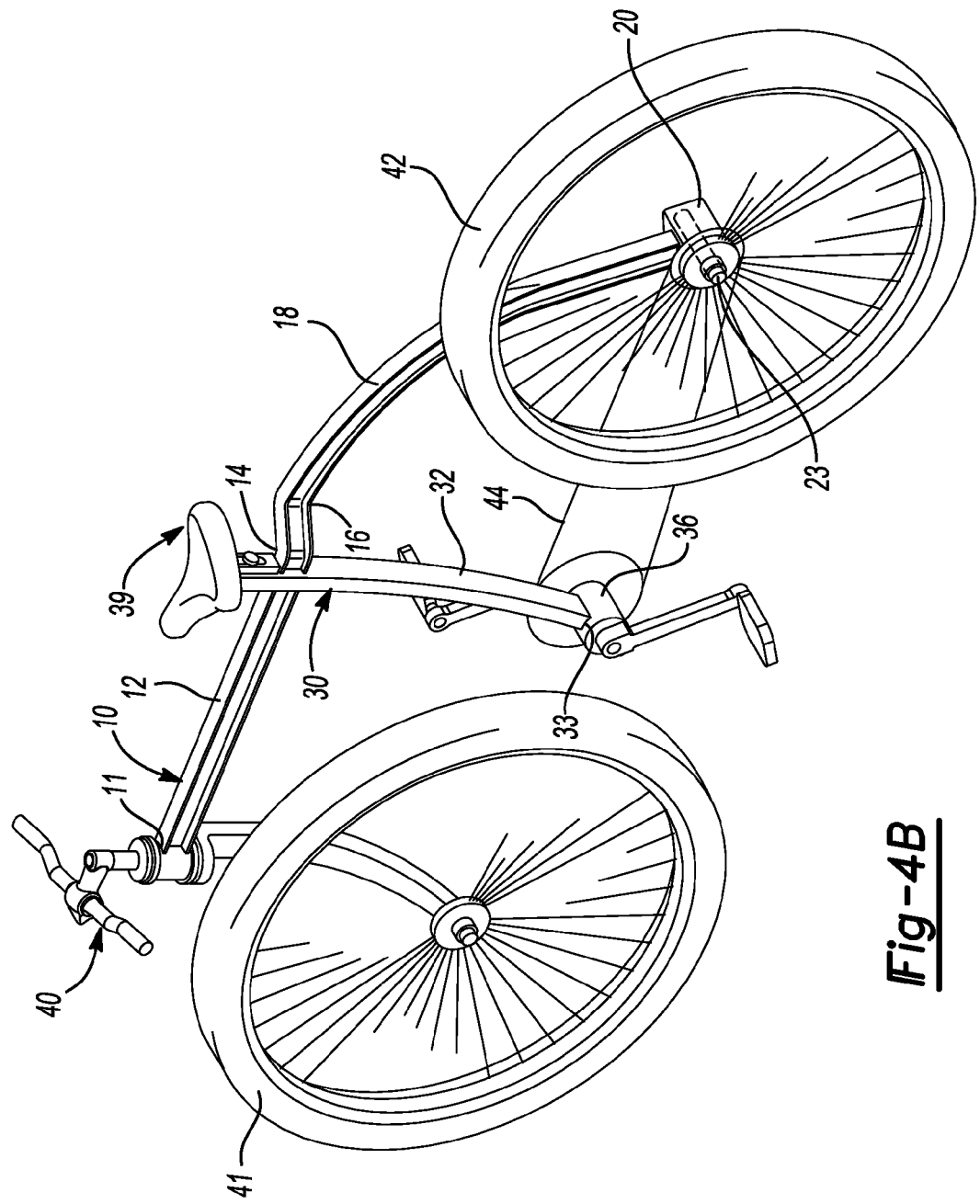

One embodiment of the lightweight cantilever bicycle frame is illustrated in FIGS. 4A and 4B. The frame comprises primary member 10 affixed to secondary member 30 by way of secondary aperture 34. Forward end 11 is affixed to front assembly 40, which supports front wheel assembly 41. Rear hub aperture 21 receives rear hub 23, which is a component of rear wheel assembly 42. In this embodiment, drive feature assembly 44 is connected at opposing ends to drive feature supporting means 36 and rear wheel assembly 42.

The manner of using the lightweight cantilever bicycle frame is similar to existing bicycle frames. Namely, the frame supports front assembly 40, front wheel assembly 41, rear wheel assembly 42, drive feature assembly 44, and bicycle seat assembly 39, thus enabling a rider to achieve self-propelled forward motion.

By utilizing primary member 10 and secondary member 30 to perform the functions of a bicycle frame, utilizing structurally efficient cross section 22 in primary member 10, and by supporting rear wheel assembly 42 in a cantilever manner, it is possible to construct a bicycle frame from less material, enabling lower construction costs and reduced weight when compared to existing designs while accommodating the use of a wide range of rear wheel assembly 42 widths. Additionally, there are fewer locations where joining methods are susceptible to failure when compared to certain existing bicycle frame designs. Furthermore, because primary member 10 will support secondary member 30 even if the joining method employed at that junction fails, the likelihood of rider injury resulting from such a failure is reduced.

Thus the reader will see that at least one embodiment of the lightweight cantilever bicycle frame is capable of providing a lighter, less expensive, more reliable bicycle frame that can accommodate a wide variety of rear tire widths. Consequently, consumers may acquire a bicycle built upon the lightweight cantilever bicycle frame to economically meet their transportation and recreation needs. While the above description contains many specificities, these should not be construed as limitations on the scope, but rather as an exemplification of one embodiment thereof. Many other variations are possible. For example, secondary member 30 may take the form of a beam, leaf spring, or other shape, depending on the application. Additionally, rear hub supporting means 20 may reflect different geometries and materials, so long as it operates in conjunction with primary member 10 to support rear wheel assembly 42 in a cantilever manner. Additionally, bicycle seat supporting means 38 may be altered, so long as it enables the adjustment of distance of bicycle seat assembly 39 from drive feature supporting means 36. Accordingly, the scope should be determined by the appended claims and the legal equivalents thereof, not by the illustrated embodiment.

I claim:
1. A bicycle frame comprising:
   a primary member including a first length of material with a forward end and a rearward end, a first bend, a second bend, a third bend, a cross section, and a rear hub supporting means at a point rearward of the second bend that supports a rear wheel assembly in a cantilever manner; and
   a secondary member including a second length of material with an upper end and a lower end, a secondary member aperture extending through the second length at a point proximal the upper end, operable to receive the primary member therethrough, and a drive feature supporting means proximal the lower end, whereby the secondary member is attached to the primary member and is operable to support a drive feature assembly between the drive feature supporting means and the rear hub supporting means, wherein the secondary member aperture reflects the cross section of the primary member.

2. The bicycle frame of claim 1, wherein the cross section of at least a portion of the first length reflects a structural shape selected from the group consisting of: symmetrical I-shapes, asymmetrical I-shapes, wide flange I-shapes, S-shapes, Z-shapes, C-shapes, Tee-shapes, hollow structural sections, single angle sections, and double angle sections, wherein the second length of material includes a leaf spring, wherein the secondary member also includes a bicycle seat supporting means proximal the upper end.

3. The bicycle frame of claim 1, wherein the cross section of at least a portion of the first length reflects a structural shape selected from the group consisting of: symmetrical I-shapes, asymmetrical I-shapes, wide flange I-shapes, S-shapes, Z-shapes, C-shapes, Tee-shapes, hollow structural sections, single angle sections, and double angle sections, wherein the second length of material includes a beam, wherein the secondary member also includes a bicycle seat supporting means proximal the upper end.

4. The bicycle frame of claim 1, wherein the cross section of at least a portion of the first length reflects a structural shape selected from the group consisting of: symmetrical I-shapes, asymmetrical I-shapes, wide flange I-shapes, S-shapes, Z-shapes, C-shapes, Tee-shapes, hollow structural sections, single angle sections, and double angle sections.

5. The bicycle frame of claim 1, wherein the secondary member also includes a bicycle seat supporting means proximal the upper end.

6. The bicycle frame of claim 1, wherein the second length of material includes a leaf spring.

7. The bicycle frame of claim 1, wherein the second length of material includes a beam.

* * * * *